United States Patent
Elshishiny et al.

(10) Patent No.: US 11,048,719 B2
(45) Date of Patent: Jun. 29, 2021

(54) GENERATING CUSTOMIZED VISUAL MAPS FROM A PLURALITY OF CONTENT SOURCES AND USER PROFILES

(71) Applicant: INTERNATIONAL BUSINESS MACHINES CORPORATION, Armonk, NY (US)

(72) Inventors: Hisham E. Elshishiny, Cairo (EG); Shady S. M. Samaan, Cairo (EG); Amr F. Yassin, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 15/249,793

(22) Filed: Aug. 29, 2016

(65) Prior Publication Data

US 2018/0060405 A1    Mar. 1, 2018

(51) Int. Cl.
*G06F 16/26*    (2019.01)
*G06F 40/30*    (2020.01)

(52) U.S. Cl.
CPC .............. *G06F 16/26* (2019.01); *G06F 40/30* (2020.01)

(58) Field of Classification Search
None
See application file for complete search history.

(56) References Cited

U.S. PATENT DOCUMENTS

| | | | | |
|---|---|---|---|---|
| 7,475,018 | B1 * | 1/2009 | DeTore | G06Q 10/00 705/1.1 |
| 8,103,445 | B2 * | 1/2012 | Smith | G09B 29/007 340/995.14 |
| 2003/0208507 | A1 * | 11/2003 | Venkatram | G06Q 30/06 |
| 2006/0166174 | A1 * | 7/2006 | Rowe | G09B 5/06 434/236 |
| 2007/0282684 | A1 * | 12/2007 | Prosser | G06Q 30/02 705/14.54 |

(Continued)

FOREIGN PATENT DOCUMENTS

| | | | |
|---|---|---|---|
| CN | 106503172 A | * | 3/2017 |
| EP | 2 207 105 A1 | | 7/2010 |

OTHER PUBLICATIONS

Badii A., et al., "Semi-Automatic Annotation and Retrieval of Visual Content Using the Topic Map Technology", Proceedings of the 1st WSEAS International Conference on Visualization, Imaging and Simulation (VIS°08). (Nov. 2008.) pp. 77-82.

(Continued)

*Primary Examiner* — Mark D Featherstone
*Assistant Examiner* — Navneet Gmahl
(74) *Attorney, Agent, or Firm* — Tutunjian & Bitetto, P.C.; Scott Dobson (57) ABSTRACT

Systems and methods for generating a customized visual map for a user are presented. The computer-implemented method may include extracting content from each of the plurality of sources, and analyzing the content by identifying and extracting at least knowledge information and topic information from the content. The computer-implemented method may further include generating a generic map from the content extracted from the plurality of content sources, creating a user profile based on preexisting skills and knowledge of the user, and generating the customized visual map representing a knowledge base for the user based on the generic map and the user profile.

20 Claims, 8 Drawing Sheets

(56) References Cited

U.S. PATENT DOCUMENTS

| | | | | |
|---|---|---|---|---|
| 2009/0106043 A1* | 4/2009 | Buckwaiter | ............ | G06Q 30/02 705/319 |
| 2009/0119584 A1 | 5/2009 | Herbst | | |
| 2010/0041007 A1* | 2/2010 | Wang | ....................... | G09B 7/00 434/322 |
| 2010/0075289 A1* | 3/2010 | Maher | ..................... | G09B 7/00 434/323 |
| 2010/0114937 A1* | 5/2010 | Hawthorne | ............ | G06Q 30/02 707/769 |
| 2010/0233663 A1* | 9/2010 | Pennington | ............ | G09B 19/00 434/219 |
| 2012/0233253 A1* | 9/2012 | Ricci | ....................... | G06Q 50/01 709/204 |
| 2012/0303357 A1* | 11/2012 | Yasin | ................ | G06F 17/30719 704/9 |
| 2014/0047414 A1* | 2/2014 | Attar | ..................... | G06F 9/4411 717/121 |
| 2014/0052659 A1* | 2/2014 | Karandikar | .............. | G09B 5/06 705/326 |
| 2014/0095303 A1* | 4/2014 | Jones | ..................... | G06F 16/29 705/14.49 |
| 2014/0172864 A1* | 6/2014 | Shum | ....................... | G06F 19/00 707/740 |
| 2014/0280214 A1 | 9/2014 | Han et al. | | |
| 2015/0026083 A1* | 1/2015 | Paliwal | .................. | G06Q 50/01 705/319 |
| 2015/0081611 A1 | 3/2015 | Shivakumar | | |
| 2015/0370798 A1* | 12/2015 | Ju | ....................... | G06F 16/9535 707/748 |
| 2016/0048849 A1* | 2/2016 | Shiftan | .............. | G06Q 30/0241 705/7.29 |
| 2016/0086499 A1 | 3/2016 | Liang et al. | | |
| 2016/0283494 A1* | 9/2016 | Krishnaswamy | ... | G06F 16/3334 |
| 2017/0308792 A1* | 10/2017 | Liang | ..................... | G06F 17/30 |
| 2018/0053261 A1* | 2/2018 | Hershey | ................ | G06F 16/686 |
| 2018/0261118 A1* | 9/2018 | Morris | .................... | G09B 5/12 |
| 2018/0366013 A1* | 12/2018 | Arvindam | ................ | G09B 5/06 |

OTHER PUBLICATIONS

"Map the Gap, A Simple Grid Approach to Successful Content Gap Analysis", Map the Gap—Strategic Content at http://strategiccontent.com/map-the-gap/. Copyright 2010-2016. pp. 1-7.

Zhoa W., et al., "Research Paper Recommendation Based on the Knowledge Gap", 2015 IEEE 15th International Conference on Data Mining Workshops held Nov. 14-17, 2015. pp. 373-380.

* cited by examiner

GENERATING CUSTOMIZED VISUAL MAPS FROM A PLURALITY OF CONTENT SOURCES AND USER PROFILES

BACKGROUND

Technical Field

The present invention relates generally to electronic data aggregation and analysis, and more specifically, to generating visual representations of analyzed data.

Description of the Related Art

Reliable, comprehensive, and generalizable methods of expanding individuals' comprehension and learning capabilities is important to our society. Means to assess the status and changes in status of understanding will have a direct impact on individuals' ability to generate, evaluate and act upon new thinking. Further, employers, schools, and many other organizations, which currently rely on less precise methods for training and instruction, will be able to increase success, decrease failure, and maximize their effectiveness via more suitable placement, more targeted development efforts, and a more thorough excavation and utilization of existing intellectual resources.

Interpreting data from numerous, non-homogenous sources is a complex task. Content from disparate data sources may have different formats, making integration and interpretation difficult and cumbersome. Analyzing the retrieved data involves mutually associating and relating large data sets. Several aggregations may be required, first to convert data into information through analysis and then to improve understandability by developing a meaningful and easily interpretable visual representation.

SUMMARY

In accordance with one embodiment of the present principles, a computer-implemented method for generating a customized visual map for a user is provided. The computer-implemented method includes extracting content from each of a plurality of sources and analyzing the content by identifying and extracting at least knowledge information and topic information from the content. The computer-implemented method further includes generating a generic map from the content extracted from the plurality of sources, creating a user profile based on preexisting skills and knowledge of the user, and generating the customized visual map representing a knowledge base for the user based on the generic map and the user profile.

In accordance with another embodiment of the present principles, a system for generating a customized visual map for a user is provided. The system includes a generic map generator to generate a generic map from a plurality of content sources, a user profile builder to create a user profile based on preexisting skills and knowledge of the user, and a customized map generator to generate the customized visual map that represents a knowledge base for the user based on the generic map and the user profile.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

Throughout the drawings, same or similar reference numerals represent the same or similar elements.

DETAILED DESCRIPTION

The present principles are directed to systems and methods for generating customized visual maps. In some embodiments, the present principles provide systems, methods and computer program products for creating customized visual maps related to end-users' profiles, skills, and/or previous knowledge, as well as their learning needs. The visual map includes a "learning" component, and, may thus, also be referred to as a "learning" map. The customized visual map is a dynamic visual map that changes constantly based on a continuous flow of information received by the user profile. An example of a visual map is a mind map presentation.

In one or more embodiments, a visual map or learning map is generated by a system including a generic map generator, a user profile builder and a personalized or customized map generator. The system accesses various disparate content sources and skills and human resources (HR) databases in order to build the personalized or customized visual map for the end-user. The system takes into account different interconnected text analyzers and engines, such as a content analyzer, a skills analyzer, a gap analyzer, and a knowledge gap recommender that work together, in tandem, to generate the customized and dynamic visual map, such as, e.g., a mind map, for the end-user.

In one or more embodiments, the proposed systems and methods generate a customized or personalized visual map for an end-user based on his/her existing knowledge, skills, and profile, and the customized visual map provides for a new learning tool that permits an end-user to easily navigate a knowledge domain. The proposed system identifies the end-user knowledge gap and recommends pre-requisite materials to fill or bridge this gap. The proposed systems and methods build a skill/knowledge profile for the end-user, after consulting various preexisting skills and various databases, such as a skills database, a course database, and HR or job experience database.

Figure 1:
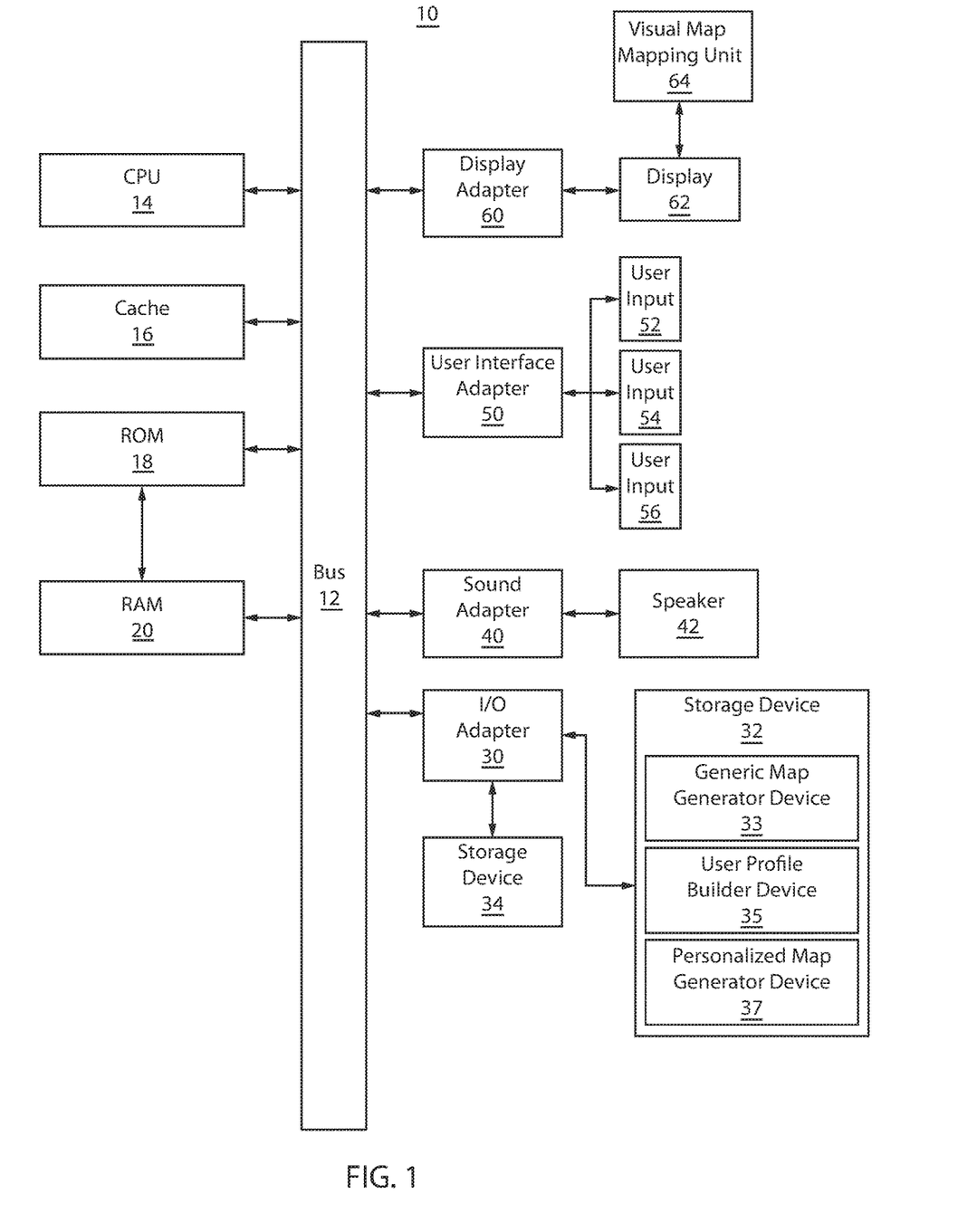
FIG. 1 is a block/flow diagram of an exemplary computing system for generating customized visual maps for a user, in accordance with an embodiment of the present principles.

Referring now to the drawings in which like numerals represent the same or similar elements and initially to FIG. 1, a block/flow diagram of an exemplary computing system for generating customized visual maps is presented, in accordance with an embodiment of the present principles.

An exemplary customized visual map processing system 10 to which the present principles may be applied is shown in accordance with one embodiment. The customized visual processing system 10 includes at least one processor (CPU) 14 operatively coupled to other components via a system bus 12. A cache 16, a Read Only Memory (ROM) 18, a Random Access Memory (RAM) 20, an input/output (I/O) adapter 30, a sound adapter 40, a user interface adapter 50, and a display adapter 60, are operatively coupled to the system bus 12.

A first storage device 32 and a second storage device 34 are operatively coupled to system bus 12 by the I/O adapter 30. The storage devices 32 and 34 can be any of a disk storage device (e.g., a magnetic or optical disk storage device), a solid state magnetic device, and so forth. The storage devices 32 and 34 can be the same type of storage device or different types of storage devices. The I/O adapter 30 further communicates with a generic map generator device 33, a user profile builder device 35, and a personalized or customized map generation device 37 for generating a customized and dynamic visual map of a user.

The generic map generator device 33, the user profile builder device 35, and the personalized map generation device 37 may be associated with the storage device 32. Such devices 33, 35, 37 need not be incorporated within the storage device 32. Such devices 33, 35, 37 may be external to the storage device 32. One skilled in the art may contemplate different system and networking configurations for incorporating the devices 33, 35, 37 therein.

A speaker 42 is operatively coupled to system bus 12 by the sound adapter 40. A display device 62 is operatively coupled to system bus 12 by display adapter 60. A map mapping unit 64 for executing visual mapping functions/operations is operatively coupled to the display device 62. In an alternative embodiment, the mapping unit 64 may be incorporated with the display device 62. The display device 62 may display a visual map 600, as discussed below with reference to FIG. 6.

A first user input device 52, a second user input device 54, and a third user input device 56 are operatively coupled to system bus 12 by user interface adapter 50. The user input devices 52, 54, and 56 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 52, 54, and 56 can be the same type of user input device or different types of user input devices. The user input devices 52, 54, and 56 are used to input and output information to and from the customized visual map processing system 10.

Of course, the customized visual map generating and processing system 10 may also include other elements (not shown), as readily contemplated by one of skill in the art, as well as omit certain elements. For example, various other input devices and/or output devices can be included in the customized visual map generating and processing system 10, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the customized visual map generating and processing system 10 are readily contemplated by one of ordinary skill in the art given the teachings of the present principles provided herein.

An embodiment of the present principles may be embodied within a software program that may provide a simple editor for outlines or visual maps. As used herein, the term "visual map" refers to "a graphic organizer representing terms, topics, relationships, hierarchy, and other concepts related to a particular term, topic, or other item." In addition to the conventional capabilities of inserting, editing, moving, and deleting items, the program may include a generic map generator, a user profile builder, and a personalized or customized visual map generation device. The system takes into account different interconnected text analyzers and engines, such as, but not limited to, a content analyzer, a skills analyzer, a gap analyzer, and a knowledge gap recommender that work together, in tandem or simultaneously, to generate the customized and dynamic visual map for the user.

Figure 2:
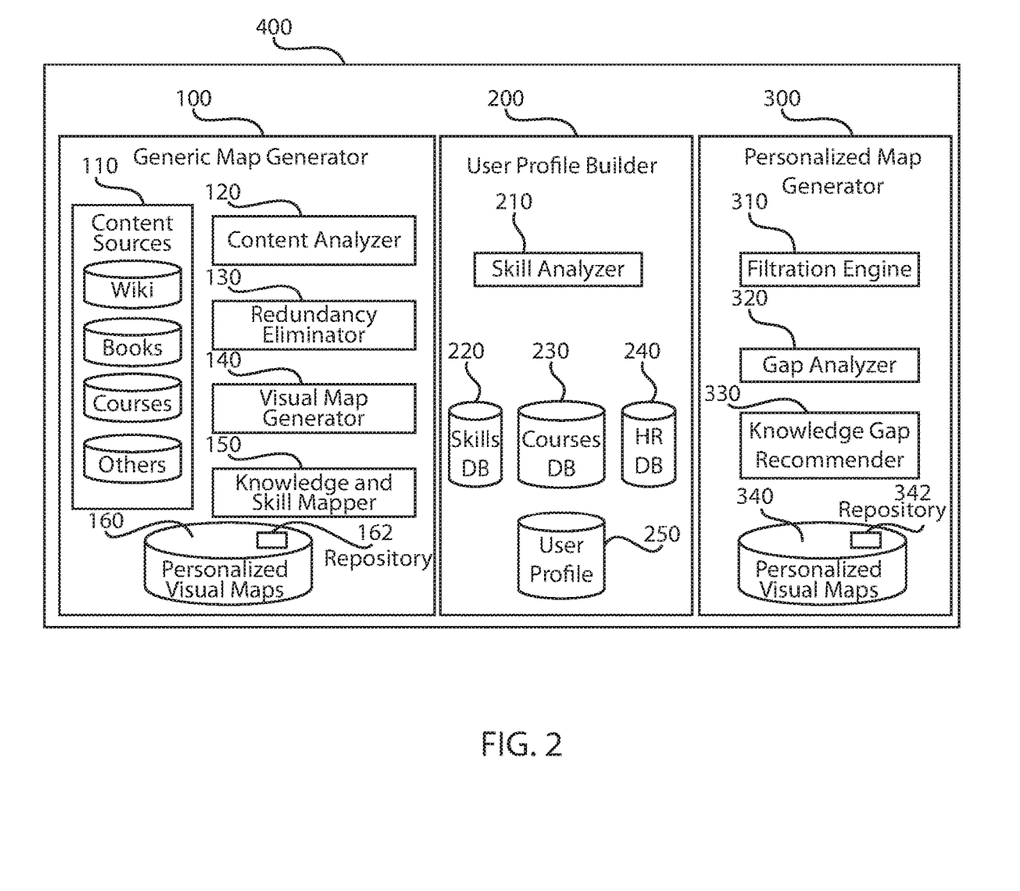
FIG. 2 is a block/flow diagram of an exemplary system for generating personalized or customized visual maps from disparate sources based on a user profile, in accordance with an embodiment of the present principles.

FIG. 2 is a block/flow diagram of an exemplary system for generating personalized or customized visual maps from disparate sources based on a user profile, in accordance with an embodiment of the present principles.

The system 400 includes a generic map generator 100, a user profile builder 200, and a personalized map generator 300.

The generic map generator 100 includes a plurality of content sources 110, a content analyzer 120, a redundancy eliminator 130, a visual map generator 140, a knowledge and skill mapper 150, and a generic visual map repository 160, including, e.g., a visual map 162.

The generic map generator 100 generates the visual map 162 from a plurality of different content sources 110. The visual map 162 is generic in the sense that it is not customized for a certain user. The visual map 162 may be a template of at least a user's generic or preexisting skills, knowledge, and experience.

The plurality of content sources 110 is a specific domain of knowledge. The plurality of content sources 110 may be selected or identified by a user or a subject matter expert (SME). The plurality of content sources 110 are used as inputs to the generic map generator 100. The plurality of content sources 110 may be, e.g., books, newspapers, journals, magazines, courses, Wikipedia™ pages, and any other electronic or non-electronic sources of information.

The content analyzer 120 performs tasks including parsing all the content from the plurality of content sources 110 (e.g., using dictionaries, thesaurus, annotators, etc.), learning or analyzing or understanding or evaluating or inspecting or studying or interpreting the contents (e.g., by using machine learning, expert training, etc.), and identifying and extracting relevant knowledge entities/information and related topics in the contents, and establishing relationships between them (e.g., by using reasoning algorithms). One example of implementing the content analyzer 120 could be through the usage of a cognitive computing system. The content analyzer 120 further identifies the topic pre-requisites based on a knowledge base. The topic pre-requisites relate to certain types of information of a topic that are required to fully understand the topic.

The redundancy eliminator 130 analyzes the contents from the content analyzer 120 and removes duplicate or redundant information. The duplicate information may be extracted from one or more of the plurality of content sources 110. The redundancy eliminator 130 may use different text analysis engines or software to detect and remove the redundancies.

The visual map generator 140 generates a visual map according to the output of the content analyzer 120. The visual map may be referred to as a learning map or a mind map. In one example embodiment, a visual map or a mind map is a diagram used to visually organize information. A visual map is often created around a single concept, drawn as an image in the center of a blank page, to which associated representations of ideas such as images, words and parts of words are added. Major ideas are connected directly to the central concept, and other ideas branch out from those. As with other diagramming tools, visual maps can be used to generate, visualize, structure, and classify ideas, and as an aid to studying and organizing information, solving problems, making decisions, and writing. Visual mapping or mind mapping software may be used to organize large amounts of information, combining spatial organization, dynamic hierarchical structuring, and node folding. Software packages can extend the concept of visual mapping by allowing individuals to map more than thoughts and ideas with information on their computers and the Internet, like spreadsheets, documents, Internet sites, images, and videos.

The knowledge and skill mapper 150 maps or correlates knowledge topics or knowledge entities/information to pre-requisite content and further maps such topics to skills.

The visual map repository 160 may include a plurality of generic visual maps. FIG. 2 illustrates one example of a generic visual map 162. The generic visual maps may be stored in the visual map repository 160 for faster retrieval.

The user profile builder 200 includes a skills analyzer 210, a skills database 220, a courses database 230, and a human resources (HR) database 240. The HR database 240 may also be referred to as an "experience" or "job-related experience" database.

The user profile builder 200 builds a user profile 250 by analyzing the skills of a user via the skills analyzer 210 and extracted from the skills database 220, the courses database 230, and the HR database 240. The databases may be referred to as repositories.

The skills analyzer 210 retrieves the different skills and skill level for the user from the skills repository 220, parses the courses repository 230 to retrieve the course information and the skills covered by such courses, retrieves the domains of expertise and years of experience for each domain from the HR repository 240 and maps or correlates them to the preexisting skills of the user, and groups the user skills to build a user profile 250 that summarizes all the skills of the user.

The skills database 220 is a repository that catalogs or archives or classifies the skills and skill level of the user. The skills may be categorized, e.g., according to different work experiences, leadership knowledge, etc. One skilled in the art may contemplate any types of skills and may contemplate organizing such skills in a plurality of different configurations.

The courses database 230 is a repository that includes a list of courses that the user has taken. The courses may be, e.g., high school courses, college courses, graduate courses, leadership courses, management courses, professional development courses, etc. One skilled in the art may contemplate any type of course or lecture or program attended with regards to any topic.

The HR database 240 is a repository that includes the user's domain of knowledge and years of experience in each domain. The domain of knowledge may be, e.g., specific to work experiences, such as jobs held throughout the user's career. The user's work experience may be broken down into time periods of work at specific jobs, as well as different skills acquired at each job. Additionally, contacts made at each job may be categorized or catalogued into different categories.

The personalized or customized map generator 300 includes a filtration engine 310, a gap analyzer 320, a knowledge gap recommender 330, and a personalized or customized visual map repository 340, including a customized visual map 342.

The personalized map generator 300 generates a personalized or customized map from the original generic visual map 162 based on the user profile 250 and any other inputs.

The filtration engine 310 customizes contents of the generic visual map 162 by removing contents that are already known by the user (e.g., based on the user profile 250). The filtration engine 310 can further receive optional inputs/keywords from the user to further customize the generated customized visual map 342.

The gap analyzer 320 identifies knowledge gaps between the user profile 250 and knowledge domain pre-requisites. For example, a knowledge domain may be patent law. In such instance, a knowledge domain pre-requisite may be trade secrets. If the user is a patent attorney who deals with patents, trademarks, and copyrights only, and has no experience in trade secret cases, then the system indicates that a knowledge gap exists between the user (i.e., the patent attorney) and a topic (i.e., patent law). The gap being the lack of experience in a pre-requisite topic, such as trade secrets.

The knowledge gap recommender 330 recommends, based on the identified gaps by the gap analyzer 320, more knowledge domain content to be added to the generic visual map 162 to cover or fill in the gaps. Referring back to the previous example, the knowledge gap recommender 330 may recommend the user (i.e., patent attorney) to bridge the gap or fill the gap (i.e., trade secret knowledge) by recommending the user to buy a specific trade secret book or sign-up for a continuing education class offered, e.g., next month at a convenient location for the user and at a reasonable cost.

The personalized visual map repository 340 may include a plurality of customized visual maps. FIG. 2 illustrates one example of a customized visual map 342. The customized visual maps may be stored in the personalized visual map repository 340 for faster retrieval.

Figure 3:
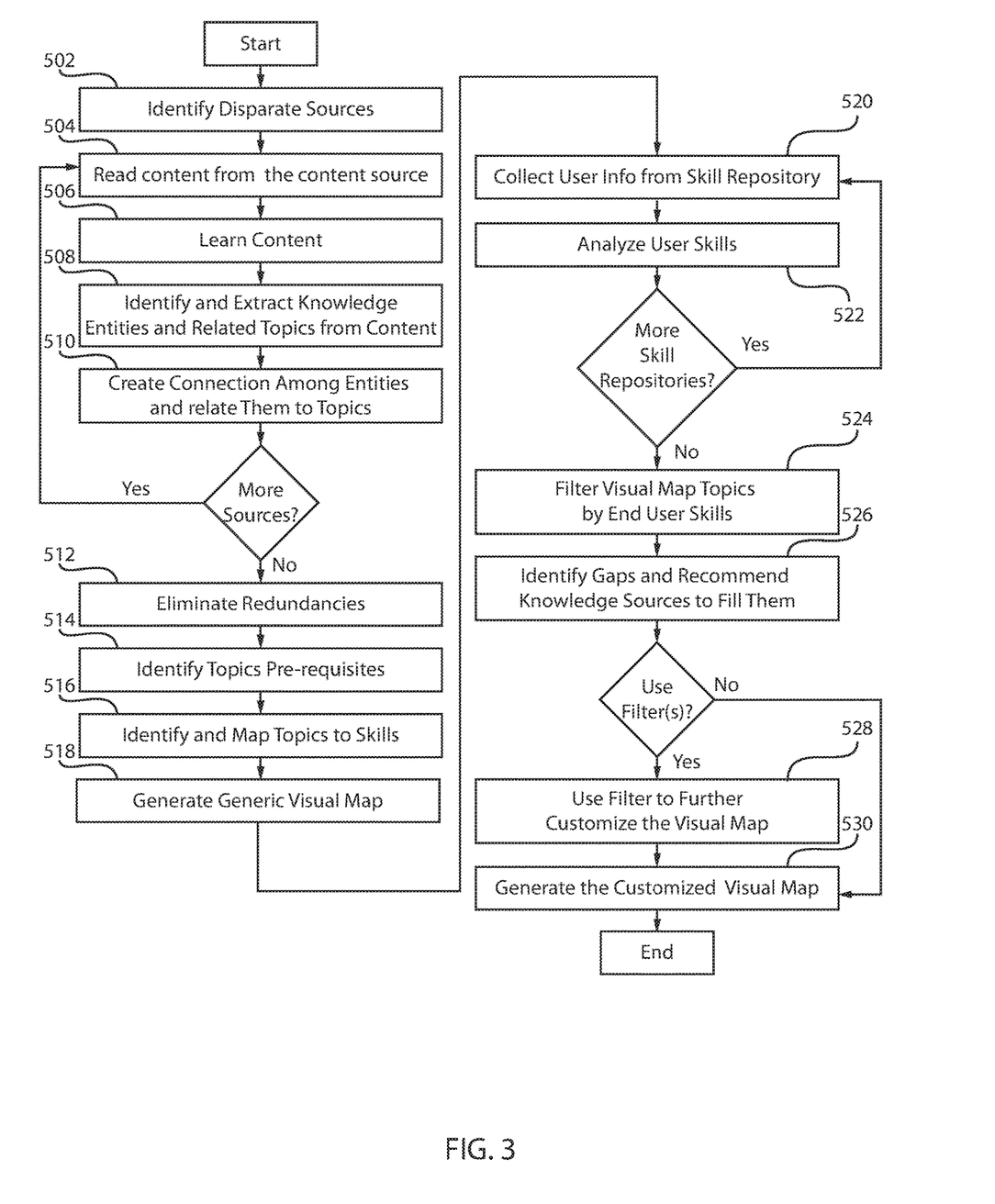
FIG. 3 is a block/flow diagram of an exemplary method for generating personalized or customized visual maps from disparate sources based on a user profile, in accordance with an embodiment of the present principles.

FIG. 3 is a block/flow diagram of an exemplary method for generating personalized or customized visual maps from disparate sources based on a user profile, in accordance with an embodiment of the present principles.

At block 502, the plurality of content sources are identified.

At block 504, content is read or identified or extracted from the plurality of content sources.

At block 506, the content is analyzed or evaluated or inspected or investigated or studied or "learned."

At block 508, knowledge entities or information and related topics are identified and extracted from the content.

At block 510, connections are created or established between the knowledge entities or information, and the knowledge entities/information are related to the topics. Thus, a relationship is established between the knowledge entities/information and between the knowledge entities and the topics. A relationship may also be established between the topics. The "relationships" may involve correlating or associating or drawing parallels between the information/data found within the content.

At block 512, once all the sources of content have been accounted for, redundancies are eliminated. In one example, redundancies may refer to duplicate information.

At block 514, topic pre-requisites are identified.

At block 516, topics are identified and mapped or correlated to preexisting skills of the user.

At block 518, a generic visual map is generated.

At block 520, user information is collected from the skills repository.

At block 522, the user skills are analyzed.

At block 524, once all the user skills have been analyzed, the topics are filtered in view of the users skills.

At block 526, gaps are identified in the users' preexisting skills and various knowledge sources are identified to fill in or bridge the gaps.

At block 528, if further filters are necessary, then additional filters are used to customize the visual map.

At block 530, if further filters are not necessary, the customized visual map is generated for the user.

Therefore, in summary, the subject matter expert (SME) and/or the system user identifies and selects the content sources related to the specific knowledge domain. Then, the content analyzer 120 of the generic map generator 100 connects to these disparate sources and retrieves a plurality of contents therefrom. The content analyzer 120 of the generic map generator 100 parses all the identified contents from the disparate sources and the content analyzer 120 analyzes or "learns" the contents by using, e.g., machine learning or expert training. The content analyzer 120 identifies and extracts the relevant knowledge entities/information and related topics in these contents, and establishes or creates relationships therebetween, e.g., by using reasoning algorithms. A redundancy eliminator 130 then analyzes and removes duplicate information. The eliminator 130 uses different text analysis engines to detect and remove the redundancies.

Moreover, the knowledge and skill mapper 150 identifies the topic pre-requisites based on a knowledge base. The knowledge and skill mapper 150 maps topics to preexisting skills of the user. The visual map generator 100 then generates the generic visual map 162 and stores it in the generic visual maps repository 160. The skill analyzer 210 retrieves the different skills and skill levels for the user from the different skills repositories 220, 230, and 240 to build a user profile 250. The filtration engine 310 of the personalized map generator 300 filters the generic map by eliminating the topics which the user already has skills for. The gap analyzer 320 performs a knowledge gap analysis. The knowledge gap recommender 330 recommends pre-requisites topics to be added to the generic map in order to fill the identified knowledge gaps. The filtration engine 310 may optimally be used by the user to provide search criteria (e.g., search keywords) that are used to further customize the personalized generated visual map 342 stored in the customized visual maps repository 340. Finally, the personalized visual map generator 300 generates the visual representation of the customized visual map based on the customized contents.

Consequently, one or more customized and dynamic visual maps may be generated for a user based on at least a user's existing skill set, a user's knowledge, and a user's experiences to create a unique or customized or customizable user profile. The customized and dynamic visual map of the user provides for a knowledge domain that can be easily navigated by the user to quickly extract or understand or decipher or interpret or deduce information or ideas or concepts. Thus, the customized visual map is a graphical way to represent ideas, concepts, knowledge, skills, and experiences of the user. It is a visual thinking tool that helps to structure information, and helps the user to better analyze, comprehend, synthesize, recall, and generate new ideas based on his/her life experiences, skills, and knowledge obtained along the way.

Figure 4:
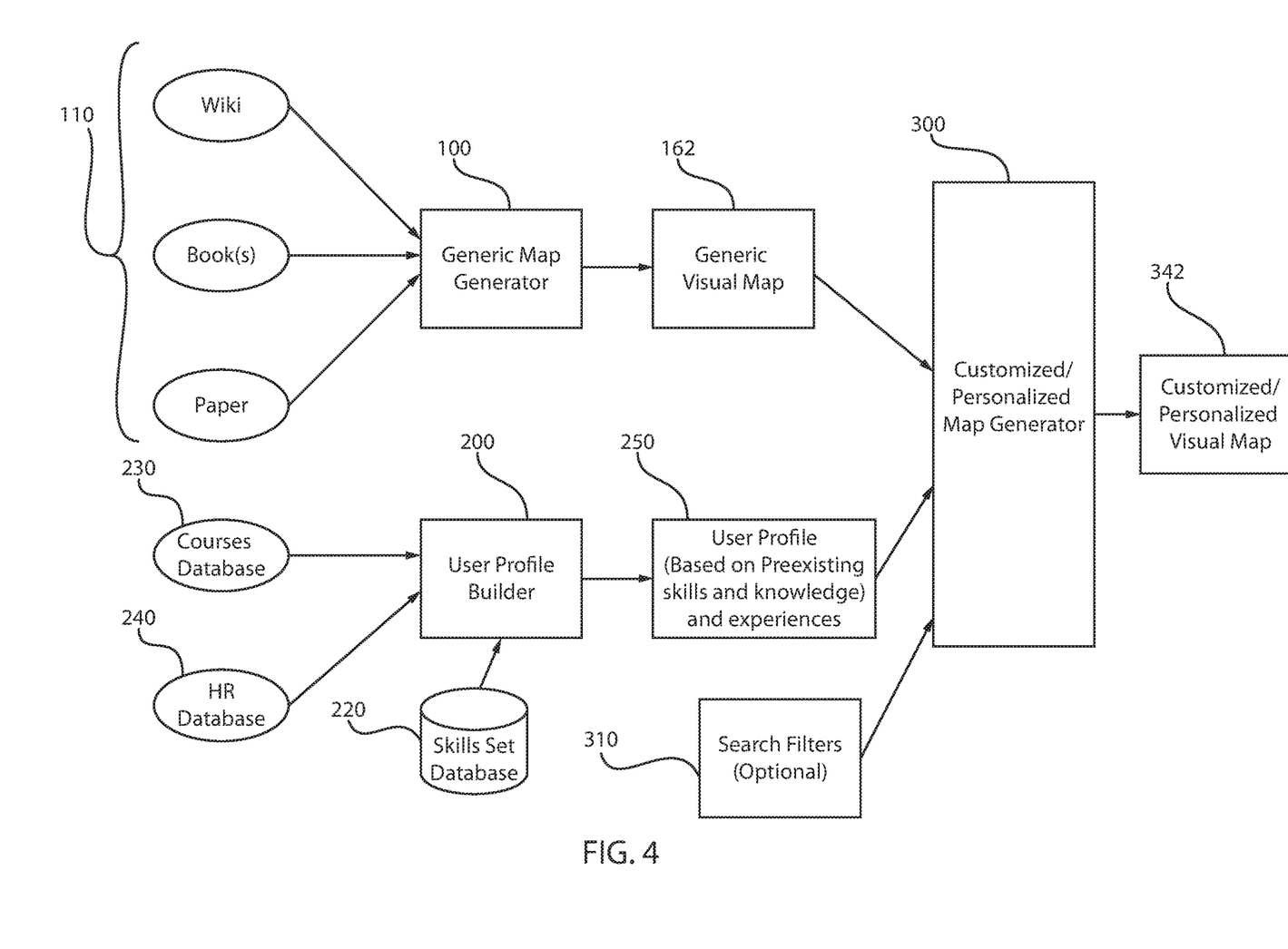
FIG. 4 illustrates flow of contents related to the generation of the personalized or customized visual maps from disparate sources based on the user profile, in accordance with an embodiment of the present principles.

FIG. 4 illustrates flow of contents related to the generation of the personalized or customized visual maps from disparate sources based on the user profile, in accordance with an embodiment of the present principles.

The flow of contents commences by providing the generic visual map generator 100 with content from a plurality of content sources 110. The flow of contents further commences by providing skills, courses, and experiences from the skills database 220, the courses database 230, and the HR database 240, respectively, to the user profile builder 200. The generic visual map generator 100 creates or outputs a generic visual map 162 and the user profile builder 200 creates or outputs a user profile 250. The generic visual map 162 and the user profile 250 are fed to the personalized or customized visual map generator 300. Optionally, search filters 310 may also be fed to the personalized or customized visual map generator 300. The personalized or customized visual map generator 300 collects and combines all this information to create the customized or personalized visual map 342 for the user.

Figure 5:
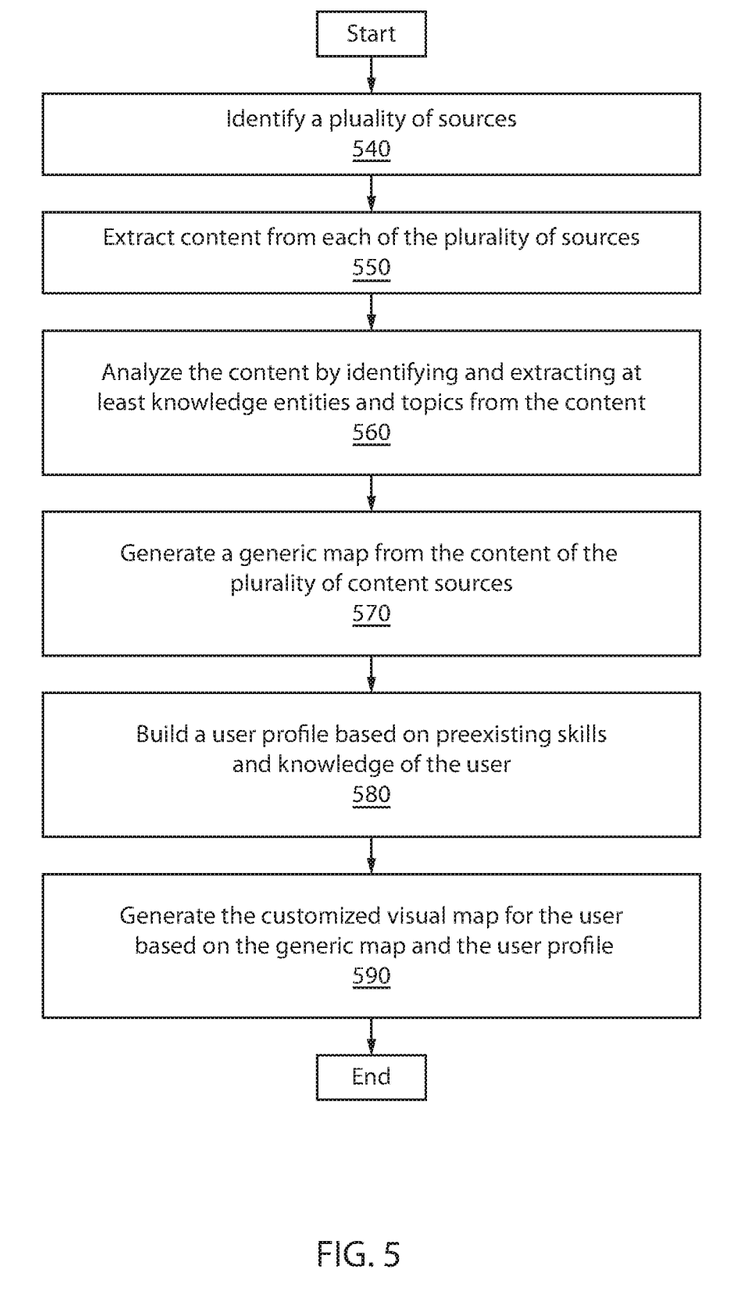
FIG. 5 is a block/flow diagram of an exemplary method for generating a customized visual map for the user based on the generic map and the user profile, in accordance with an embodiment of the present principles.

FIG. 5 is a block/flow diagram of an exemplary method for generating a customized visual map, such as a mind map, for the user based on the generic map and the user profile, in accordance with an embodiment of the present principles.

At block 540, a plurality of sources are identified.

At block 550, content is extracted from each of the plurality of sources.

At block 560, the content is analyzed by identifying and extracting at least knowledge entities/information and topics from the content.

At block 570, a generic map is generated from the content derived from the plurality of content sources.

At block 580, a user profile is built based on preexisting skills and knowledge of the user.

At block 590, a customized visual map is generated for the user based on the generic map and the user profile.

Figure 6:
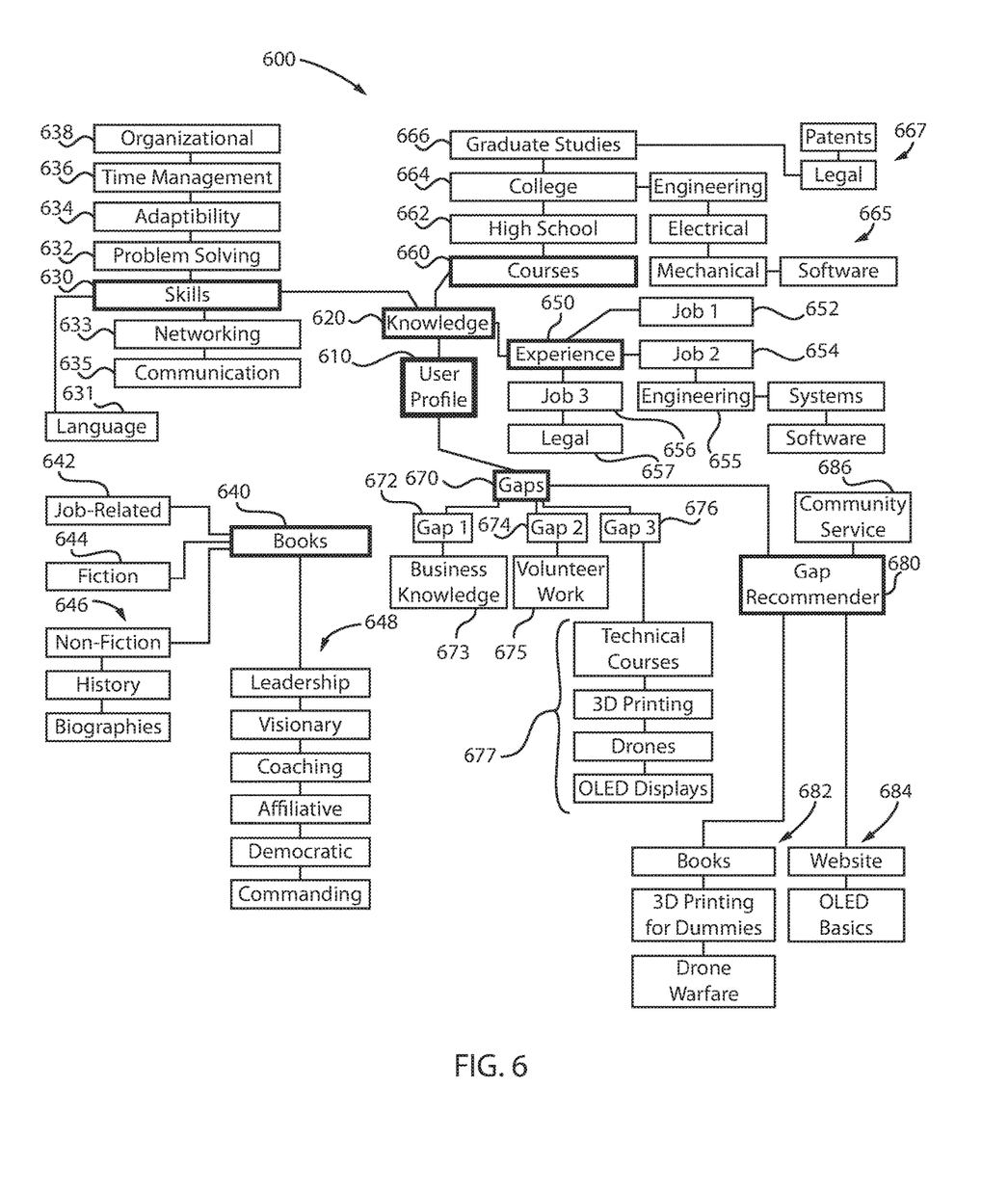
FIG. 6 is an example visual map displayed on one or more displays, in accordance with an embodiment of the present principles.

FIG. 6 is an example visual map displayed on one or more displays, in accordance with an embodiment of the present principles.

The example visual map 600 features a user profile 610 at the center of it. The user profile 610 branches off in several directions and connects to several content sources, as well as to content gap fillers.

The user profile 610 connects to knowledge content 620. The knowledge content 620 may branch off into skills content 630 and course content 660. The skills content 630 may connect to several different preexisting skills acquired or possessed by the user. For example, the user has acquired problem solving skills 632, adaptability skills 634, time management skills 636, and organization skills 638. The user further has acquired language skills 631. For example, the user may speak Spanish fluently. The user further has acquired networking skills 633 and communication skills 635. For example, the user may participate is several networking events related to his/her field of study. The course content 660 may branch off to high school courses 662, college courses 664, and graduate study courses 666. The college courses 664 may indicate more specificity, such as engineering courses 665. The engineering courses may be further broken down into electrical courses and mechanical courses. The electrical courses may include at least software courses. Additionally, the graduate study courses 666 may involve legal courses 667, such as patent classes.

Therefore, the user profile 610 may incorporate all the data/information or content from the knowledge content 620, which includes, e.g., at least user skills 630 and user courses 660. All this content is used to shape and build and customize the user profile 610.

However, the user profile 610 connects to further sources of content. For example, the user profile 610 connects to experience content 650. The experience content 650 may include information related to a first job 652 held by the user, a second job 654 held by the user, and a third job 656 held by the user. The second job may be an engineering job 655. The engineering job may be broken down or subdivided into further specific departments. For example, the second job may have involved working in a systems engineering department, e.g., for 6 months, and working in a software engineering department, e.g., for 12 months. The third job may be a legal job 657. The legal job 657 may also be broken down or subdivided into further specific departments. For example, the legal job 657 may have involved working in a patent law firm, where the user practiced trademark law and copyright law, e.g., for 3 years. The user content may involve dates when such jobs were held and details about each experience. Additionally, the user content may include contacts made along the way.

Therefore, the user profile 610 may incorporate all the data/information or content from the knowledge content 620, which includes, e.g., at least user skills 630 and user courses 660, and the experience content 650. All this content is used to shape and build and customize the user profile 610.

The user profile 610 may also connect to books content 640. The books content 640 may include various books read by the user. The user may have read job-related books 642, fiction books 644, and non-fiction books 646. The non-fiction books 646 may be subdivided into history books and biographies. The job-related books 642 may be divided into engineering books and patent law books. The books content 640 may also refer to leadership books 648 read by the user. Such leadership books 648 may be subdivided into different categories of leadership, such as visionary, coaching, affiliative, democratic, and commanding. Each one of these categories can be subdivided even further, based on author and corporations associated with the author. Thus, the user content may be subdivided into a number of different layers for each category. The user content may also include dates when such books were read. The user content may also include a summary or outline of each of the books read.

One skilled in the art may contemplate incorporating any type of useful information and details into the knowledge content 620, the skills content 630, the courses content 660, the experience content 650, and the books content 640. Additionally, the user may incorporate other content into the user profile 610. The user profile 610 is not limited to the types of content disclosed herein. Further content may include hobby content, sports content, personal relationship content, etc.

The user profile 610 may also manipulate or examine or explore or investigate such content received from a plurality of different sources to improve the knowledge base of the user. For example, after an analysis is performed and the received content is examined, gaps 670 may be shown in the knowledge base of the user. In one instance, there may be a first gap 672, a second gap 674, and a third gap 676. The first gap 672 may relate to some sort of business knowledge gap 673. The second gap 674 may relate to volunteer experience gaps 675. The third gap 676 may relate to technical knowledge gaps 677. For instance, the technical knowledge gaps 677 may relate to topics, such as 3D printing, drone technology, and organic light-emitting diode displays or OLED displays. A gap recommender 680 may communicate with the user profile 610 to recommend or propose different courses of action to fill in those gaps. For example, regarding the third gap 676 related to technical courses 677, the gap recommender 680 may recommend the user to read certain books 682 related to the topics of 3D printing (e.g., 3D printing for Dummies) and drones (Drone Warfare). Further, the gap recommender 680 may recommend the user to read certain websites 684 related to OLED basics that list journal articles by leading scientists in the field. Regarding the second gap 674 related to volunteer experience 675, the gap recommender 680 may recommend the user to perform some sort of community service 686. Based on the user profile 610 created so far, the gap recommender 680 may find legal pro bono services related to the intellectual property field that are within, e.g., a 10 mile radius of the user. Thus, the gap recommender 680 may advance specific proposals that would supplement or compliment or enhance the knowledge base of the user.

In one or more embodiments, the visual map is a customized and dynamic visual map that is automatically and continuously updated, in real-time, as the user inputs information into the user profile. The user may input information/data and/or content at any time to dynamically change the makeup and characteristics of the visual map. The visual map may be implemented with software and may be displayed on one or more displays and/or electronic devices. In one example embodiment, the dynamic visual map may be controlled by a mobile device of the user. Thus, the visual map may be updated or modified or customized at any time by the user via, e.g., a mobile device.

In one or more embodiments, the user may create a plurality of different dynamic visual maps (e.g., mind maps). One dynamic visual map may relate to work or job experience skills only, whereas another dynamic visual map may relate to recreational reading content only. Thus, the user has the capability to build a number of different dynamic visual maps based on different user-selected categories. The different dynamic visual maps may communicate with each other and yet be separate and distinct. However, it is contemplated that the different dynamic visual maps may be isolated and not communicate with each other.

In one or more embodiments, the dynamic visual maps of one user may be compared to dynamic visual maps of other users. For example, a first user may be a lawyer practicing patent law and having an electrical engineering background. The first user may work for a law firm in, e.g., a small town in South Carolina. A second user may be a lawyer practicing patent law for a big name law firm in, e.g., NYC. The first user may want to expand his knowledge base to work in NYC. To do so, the first user may compare his visual map profile (or mind map profile) to the second user's visual map profile to determine what gaps he has in transitioning to a big law firm in NYC. Thus, user profile comparisons may enable users to fill in or bridge gaps in order to achieve one or more goals (e.g., job transition, career change, etc.).

Figure 7:
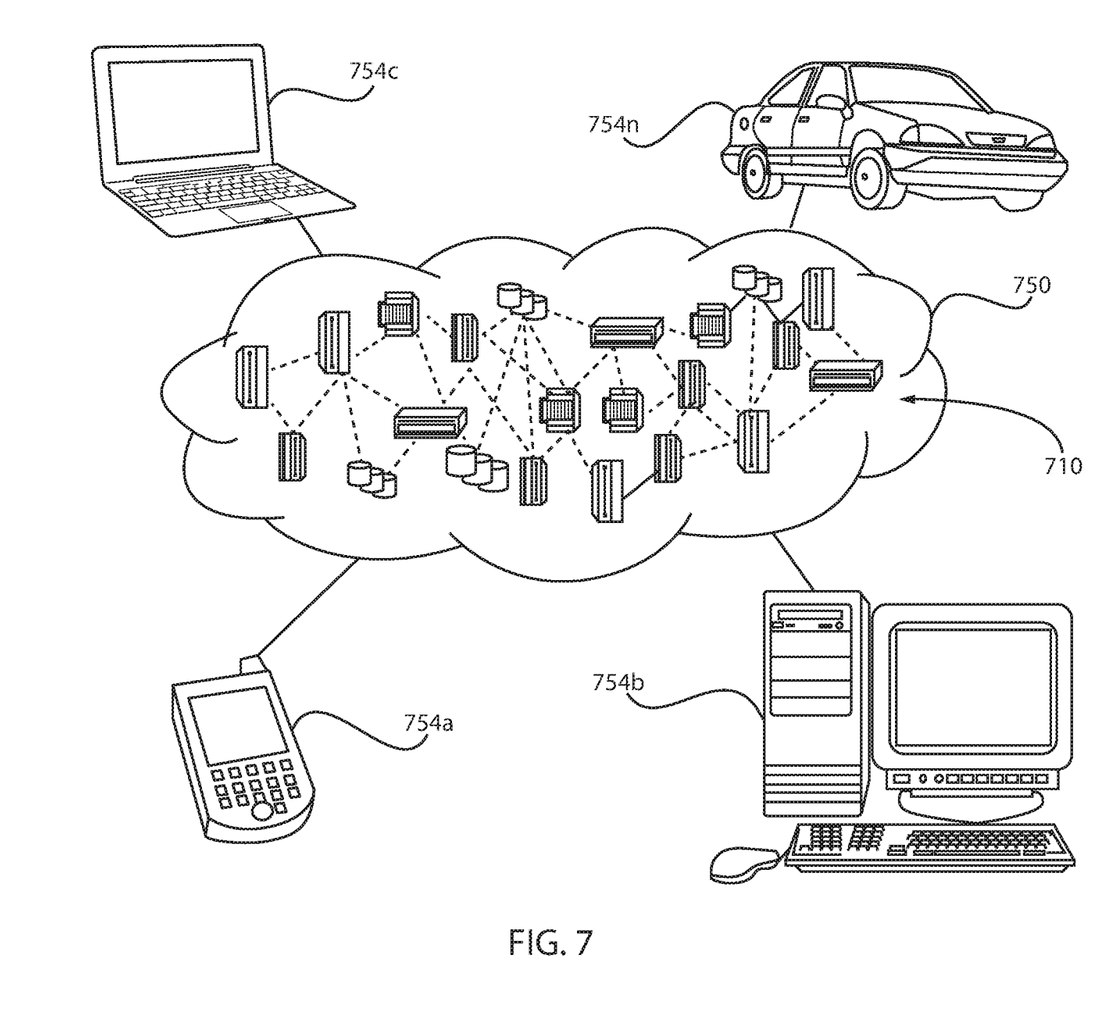
FIG. 7 is a block/flow diagram of an exemplary cloud computing environment, in accordance with an embodiment of the present principles.

FIG. 7 is a block/flow diagram of an exemplary cloud computing environment, in accordance with an embodiment of the present principles.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 750 is depicted for use with customized visual map generation based on skills and knowledge used to create a user profile. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. The network may also be a network for customized visual map generation based on skills and knowledge used to create a user profile. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
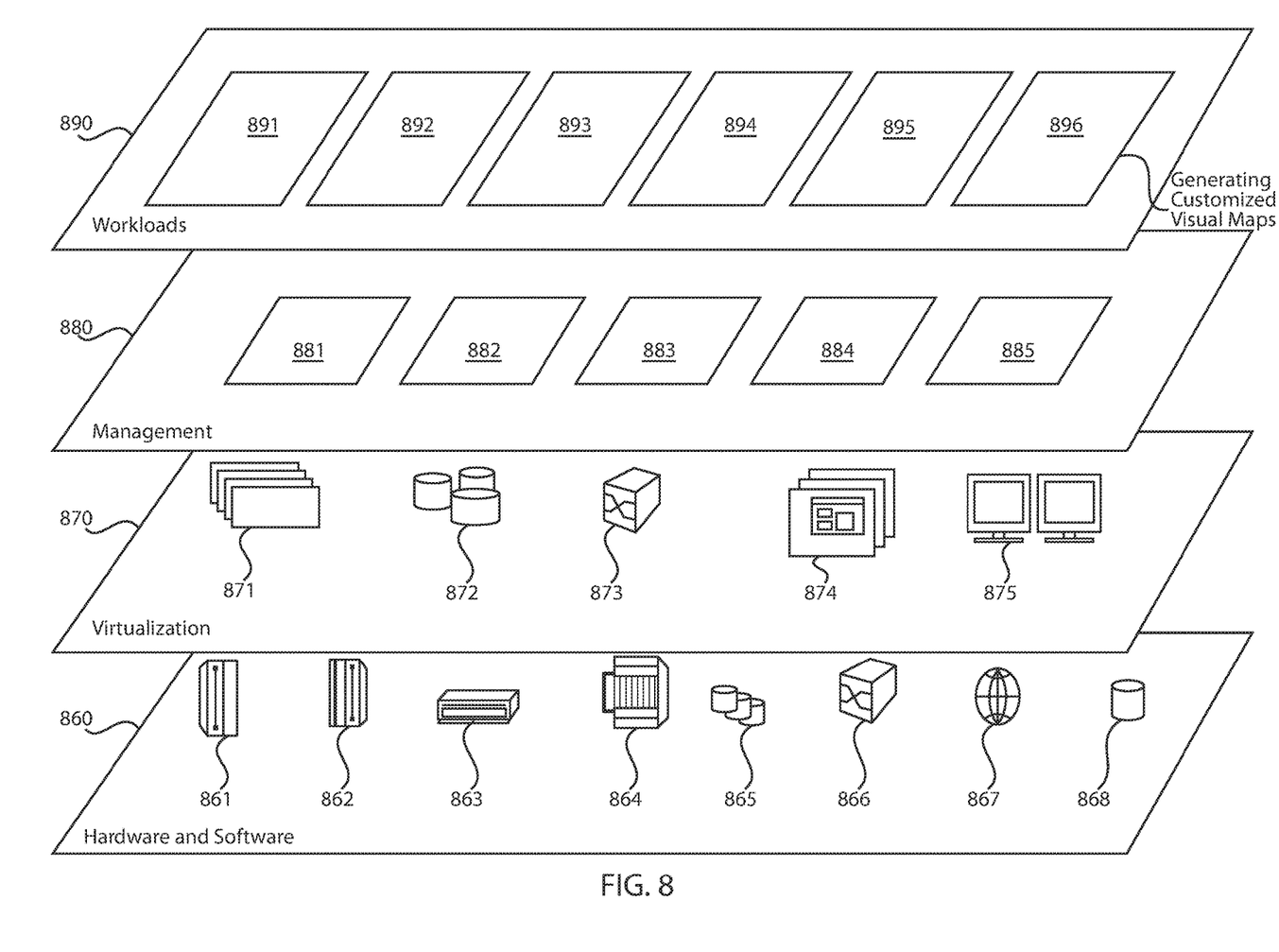
FIG. 8 is a schematic diagram of exemplary abstraction model layers, in accordance with an embodiment of the present principles.

FIG. 8 is a schematic diagram of exemplary abstraction model layers, in accordance with an embodiment of the present principles. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and customized visual map generation 896.

Still yet, any of the components of the present invention could be created, integrated, hosted, maintained, deployed, managed, serviced, etc. by a service supplier who offers to provide a method for customized visual map generation based on skills and knowledge used to create a user profile. Thus, the present invention discloses a process for deploying, creating, integrating, hosting, maintaining, and/or integrating computing infrastructure, including integrating computer-readable code into the computer system 10 (FIG. 1), wherein the code in combination with the computer system 10 is capable of performing a method for customized visual map generation based on skills and knowledge used to create a user profile. In another embodiment, the invention provides a business method that performs the process blocks/steps of the invention on a subscription, advertising, and/or fee basis. That is, a service supplier, such as a Solution Integrator, could offer to provide a method for customized visual map generation based on skills and knowledge used to create a user profile. In this case, the service supplier can create, maintain, support, etc. a computer infrastructure that performs the process blocks/steps of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed on a processor for generating a customized visual map for a user, the method comprising:

extracting content from each of a plurality of sources;

analyzing the content by identifying and extracting at least knowledge information and topic information from the content;

generating a generic map from the content extracted from the plurality of sources, the generic map being a template free from association with any user;

creating a user profile based on preexisting skills, courses, work experience, and knowledge of the user;

generating, via a customized visual map generator, a plurality of customized and dynamic visual maps collectively representing a knowledge domain of the user by feeding the customized visual map generator concurrently with the generic map and the user profile including the preexisting skills, courses, work experience, and knowledge of the user, wherein each of the plurality of customized and dynamic visual maps of the user are compared, by the user's initiative, to each of a plurality of independently created customized and dynamic visual maps of other users of comparable background, thus allowing the user to assess knowledge gaps between each of the plurality of customized and dynamic visual maps of the user and each of the plurality of independently created customized and dynamic visual maps of other users of comparable background so that the user selects and self-manages particular knowledge gaps to bridge, where user self-management of the particular knowledge gaps bridged is derived directly from differences found by the user in visual map comparisons; and once the user has selected the particular knowledge gaps to bridge, enabling the user to employ a mobile device to create and display a revised customized and dynamic visual map including the particular bridged knowledge gaps.

2. The method of claim 1, further comprising creating relationships between the knowledge information and relating the knowledge information to the topic information.

3. The method of claim 1, further comprising removing duplicate information when analyzing the content.

4. The method of claim 1, further comprising identifying and correlating the topic information to the preexisting skills of the user.

5. The method of claim 1, further comprising:
retrieving the preexisting skills of the user;
retrieving course information and skills covered by courses designated in the course information;
retrieving work experience from different domains;
retrieving reading materials read by the user; and
combining the course information, the work experience, and the reading materials with the preexisting skills of the user.

6. The method of claim 1, further comprising identifying topic pre-requisites after the knowledge base of the user derived from the customized visual map is created.

7. The method of claim 6, further comprising identifying user knowledge gaps by analyzing the customized visual map and the topic pre-requisites.

8. The method of claim 7, further comprising examining the user knowledge gaps, and in response to such examination, recommending additional knowledge content to be acquired for updating the customized visual map.

9. The method of claim 1, further comprising dynamically updating the customized visual map, continuously and in real-time, by incorporating additional content.

10. A system for generating a customized visual map for a user, the system comprising:
a memory; and
one or more processors in communication with the memory configured to:
generate, via a generic map generator, a generic map from a plurality of content sources, the generic map being a template free from association with any user;
create, via a user profile builder, a user profile based on preexisting skills, courses, work experience, and knowledge of the user; and
generate, via a customized map generator, a plurality of customized and dynamic visual maps that collectively represent a knowledge domain of the user by feeding the customized map generator concurrently with the generic map and the user profile including the preexisting skills, courses, work experience, and knowledge of the user, wherein each of the plurality of customized and dynamic visual maps of the user are compared, by the user's initiative, to each of a plurality of independently created customized and dynamic visual maps of other users of comparable background, thus allowing the user to assess knowledge gaps between each of the plurality of customized and dynamic visual maps of the user and each of the plurality of independently created customized and dynamic visual maps of other users of comparable background so that the user selects and self-manages particular knowledge gaps to bridge, where user self-management of the particular knowledge gaps bridged is derived directly from differences found by the user in visual map comparisons;
wherein, once the user has selected the particular knowledge gaps to bridge, enabling the user to employ a mobile device to create and display a revised customized and dynamic visual map including the particular bridged knowledge gaps.

11. The system of claim 10, wherein the generic map generator includes at least a content analyzer, a redundancy eliminator, a visual map generator, a knowledge and skill mapper, and a generic visual map repository.

12. The system of claim 11, wherein the content analyzer:
parses contents received from the plurality of content sources;
analyzes the contents to identify and extract at least knowledge information and topic information from the contents; and
identifies topic pre-requisites after the knowledge base of the user derived from the customized visual map is created.

13. The system of claim 11, wherein the redundancy eliminator removes duplicate information from the content analyzer.

14. The system of claim 10, wherein the user profile builder includes at least a skills analyzer, a skills database, a courses database, and a human resources (HR) database related to experiences of the user.

15. The system of claim 14, wherein the skills analyzer:
retrieves the preexisting skills of the user;
retrieves course information and skills covered by courses designated in the course information;
retrieves work experience from different domains;
retrieves reading materials read by the user; and
combines the course information, the work experience, and the reading materials with the preexisting skills of the user.

16. The system of claim 10, wherein the customized map generator includes at least the filtration engine, a gap analyzer, a knowledge gap recommender, and the customized visual map repository.

17. The system of claim 16, wherein:
- the gap analyzer identifies user knowledge gaps from analysis of the customized visual map and topic prerequisites; and
- the knowledge gap recommender examines the user knowledge gaps, and in response to such examination, recommends additional knowledge content to be acquired to update the customized visual map.

18. The system of claim 10, wherein the customized visual map is dynamically updated, continuously and in real-time, by incorporation of additional content.

19. A non-transitory computer readable storage medium comprising a computer readable program for generating a customized visual map for a user, wherein the computer readable program when executed on a computer causes the computer to perform the steps of:
- extracting content from each of a plurality of sources;
- analyzing the content by identifying and extracting at least knowledge information and topic information from the content;
- generating a generic map from the content extracted from the plurality of sources, the generic map being a template free from association with any user;
- creating a user profile based on preexisting skills, courses, work experience, and knowledge of the user;
- generating, via a customized visual map generator, a plurality of customized and dynamic visual maps collectively representing a knowledge domain of the user by feeding the customized visual map generator concurrently with the generic map and the user profile including the preexisting skills, courses, work experience, and knowledge of the user, wherein each of the plurality of customized and dynamic visual maps of the user are compared, by the user's initiative, to each of a plurality of independently created customized and dynamic visual maps of other users of comparable background, thus allowing the user to assess knowledge gaps between each of the plurality of customized and dynamic visual maps of the user and each of the plurality of independently created customized and dynamic visual maps of other users of comparable background so that the user selects and self-manages particular knowledge gaps to bridge, where user self-management of the particular knowledge gaps bridged is derived directly from differences found by the user in visual map comparisons; and
- once the user has selected the particular knowledge gaps to bridge, enabling the user to employ a mobile device to create and display a revised customized and dynamic visual map including the particular bridged knowledge gaps.

20. The non-transitory computer readable storage medium of claim 19, wherein the method further includes:
- identifying user knowledge gaps by analyzing the customized visual map and topic pre-requisites;
- examining the user knowledge gaps, and in response to such examination, recommending additional knowledge content to be acquired for updating the customized visual map; and
- dynamically updating the customized visual map, continuously and in real-time, by incorporating additional content.

* * * * *